Patented Apr. 29, 1941

2,240,038

UNITED STATES PATENT OFFICE 2,240,038

POLYMERIZATION OF CASHEW NUT SHELL LIQUID AND PRODUCTS THEREOF

Mortimer T. Harvey, East Orange, and Frederick M. Damitz, Millburn, N. J., assignors, by direct and mesne assignments, to The Harvel Corporation, a corporation of New Jersey No Drawing. Application June 2, 1938, Serial No. 211,466

5 Claims. (Cl. 260—46)

The present invention relates to methods and steps for modifying the juices of trees and shrubs of the Anacardiaceae family such, for example, as cashew nut shell liquid and the juice of *Rhus vernicifera* for the purpose of changing them from the natural skin vesicating state to a state in which they are free from the characteristic, and the present invention also relates to the modified cashew nut shell liquid and other juices in the non-vesicating condition and to method and steps for the use thereof.

It is well known that cashew nut shell liquid and the juice of *Rhus vernicifera* in the natural condition contain elements or radicals in combinations which cause a vesicant action on the human skin when they come in contact with the same. The vesicant effect, although it is temporary and leaves no harmful after effect, is highly disagreeable and uncomfortable in some cases and is usually accompanied by swelling and itching.

We have discovered that the poisonous or vesicating juices such as cashew nut shell liquid, marking nut shell liquid, the juice of *Rhus vernicifera*, the juice of the poison ivy plant (*Rhus vernix*), and so on contain sulphur, apparently in a sulphide combination, and we have further discovered that the combinations which cause the poisoning or vesicant action are altered or destroyed when the juice, such as cashew nut shell or any of the others, is treated to modify, to destroy or to remove therefrom the natural sulphide content. As a result the irritating or vesicating action on the human skin is eliminated. Various methods and steps for the treatment of these juices such, for example, as cashew nut shell liquid, to secure this modification are described below together with a disclosure of the characteristics of the modified product and of steps of using said product.

An object of the present invention is to provide a general method of treating cashew nut shell liquid or other Anacardiaceae juice for the purpose of modifying the same from the natural vesicant condition to a non-vesicant condition.

Another object of the present invention is to provide methods of removing or destroying the natural sulphide content from cashew nut shell liquid or other Anacardiaceae juices.

Another object of the present invention is to provide modified Anacardiaceae juice such, for example, as cashew nut shell liquid products which are free from the vesicant action characteristic of cashew nut shell liquid or other juice in the natural state.

Another object of the present invention is to provide a method for removing or destroying the sulphide content of cashew nut shell liquid and still have said liquid in a form applicable to and usable in the several arts in which it is useful in the natural condition.

Other objects of the present invention will be apparent from the following description of products and methods and steps for preparing and using the same.

A. According to my present invention, and as an illustrative example of a method of practicing the invention, cashew nut shell liquid is freed of its naturally occurring sulphide content by heating with a small quantity of a reagent which will react with the sulphide sulphur or with the radical in which said sulphur occurs. Illustrative examples of material found suitable for breaking off the naturally occurring sulphide sulphur from cashew nut shell liquid are as follows: sulphuric acid, hydrochloric acid, phosphoric acid, acetic acid, sodium acid phosphate, lead acetate and chlorine gas. A particular example is as follows: A given weight of dehydrated raw cashew nut shell liquid has added to it two and one-half (2½%) per cent of its weight in concentrated sulphuric acid and five (5%) per cent of its weight in water, and the mixture emulsified by stirring. The emulsion is then heated to about 195° C. to drive off resulting hydrogen sulphide gas and held at this temperature until a somewhat stringy body is obtained whereupon it is cooled and is suitable for use (alone or with drying oils or otherwise), with driers, formaldehyde and so on as described in the patents of Mortimer T. Harvey, Nos. 1,725,791 to 1,725,795, issued August 27, 1929, and others issued since that date. For illustrative example, the heated emulsion as above described can be chilled back with two-thirds of a part of linseed oil, carried up to about 300° C. and about 2½% litharge added, and again chilled back with one-third part of linseed oil. At about 325° F. this varnish mixture is thinned with a solvent such as high flash naphtha or Varnoline to a desired solids content, e. g., about 50%.

B. An illustrative example in which both sulphuric acid and hydrochloric acid are used is as follows: To a given quantity of cashew nut shell liquid are added the following material, in proportionate amounts by weight of the cashew nut shell liquid: hydrochloric acid (specific gravity 1.2), about five per cent; sulphuric acid (specific gravity 1.8), about one-half of one per cent; and water, about five per cent. The materials are stirred with a mechanical mixer to form an emulsion which is then heated under a reflux condenser for about two and one-half hours at about 110° C. to drive off the sulphide sulphur as hydrogen sulphide gas which passes out through the reflux condenser. The material thus treated is then cooled and is ready for use for any purpose for which cashew nut shell liquid is suitable, for example, for uses and methods disclosed in patents of Mortimer T. Harvey, Numbers 1,725,791 to 1,725,797 inclusive, issued August 27, 1929, and others issued since then.

C. Likewise, sulphuric acid alone is used for dissociating the sulphur from cashew nut shell liquid, for example to a quantity of cashew nut shell liquid there is added about two and one-half per cent of the weight thereof in sulphuric acid (specific gravity 1.8) and the two mixed together and heated up to about 150° C. during which the combined sulphur in the cashew nut shell liquid is broken off and driven off as hydrogen sulphide gas. The product of this reaction is a fairly thick polymer which can be cut with a solvent and/or a drying oil such as linseed or China-wood oil to be made up into a varnish or coating. Or, it can be heated further, for example at about 120° C. and thickened further into a polymer similar to rubber. This polymer is suitable for setting or vulcanizing with sulphur which can be milled into it for use as a rubber substitute or it can be milled into rubber to give rubber products the qualities of oil, acid and alkali resistance which it has. Also, the product of this reaction can be set with hexamethylenetetramine or with paraformaldehyde. It is specially noted that the addition of sulphur to the modified cashew nut shell liquid, that is, to cashew nut shell liquid from which the naturally occurring sulphur content has been removed, does not return the material to its former and natural vesicating state or otherwise affect it in this respect. The material remains free of the vesicating characteristic.

D. Another example, in which hydrochloric acid is used to break off the sulphide sulphur and form hydrogen sulphide therefrom, is as follows: To a given quantity of commercial cashew nut shell liquid about five per cent of the volume of the cashew nut shell liquid in hydrochloric acid (specific gravity 1.18) is added and stirred in with a mechanical stirrer to form an emulsion. The emulsion is heated under a reflux condenser for about two to three hours at about 100° to 110° C. to change the sulphide sulphur of the cashew nut shell liquid to hydrogen sulphide gas which is driven off through the condenser. The resulting product is a non-drying liquid which has the properties of cashew nut shell liquid generally but is free of the vesicating action characteristic of the latter.

E. Also as an illustrative example, the natural sulphur content of cashew nut shell liquid can be broken off with chlorine which is blown into the cashew nut shell liquid over a period of time to react with the sulphur.

After the treatment for removing the sulphide sulphur, the cashew nut shell liquid can be tested for completeness of the reaction by the following method. Twenty-five grams of treated cashew nut shell liquid, twenty-five grams of a high boiling point solvent free from sulphur compounds (tetraline, for example), and five cubic centimeters of eighty-five per cent orthophosphoric acid are boiled together under a reflux condenser for about thirty minutes. The solvent, tetraline for example, can be omitted. A tube from the top of the reflux condenser leads the vapors into five cubic centimeters of a ten per cent lead acetate solution (either in water or glacial acetic acid). At the end of the thirty minutes the heating is discontinued and a slow stream of air passed through the condenser and into the lead acetate to carry any hydrogen sulphide gas into the latter. Cashew nut shell liquid treated for removing the sulphide content and which under test as above showed absence of sulphide was spotted on the arms of several persons known to be sensitive to cashew nut shell liquid itch but no itch appeared or was felt nor any other manifestations characteristic of cashew vesication. By this method of testing the steps selected from the above, or developed, for removing the sulphide from cashew nut shell liquid can be controlled and regulated to obtain optimum results both as to freeing the cashew nut shell liquid of the vesicating characteristics and for obtaining the treated cashew nut shell liquid in a condition to suit any one or more of various uses of cashew nut shell liquid in the arts. If an excess of acid is used in the deitching process a degree of acid burn or reddening on the skin might result, but this can be avoided by neutralizing the excess acid, for example with caustic soda solution.

The present application is a continuation in part of our copending application Serial No. 620,551, filed July 1, 1932.

During the treatment of cashew nut shell liquid as set forth above, naturally occurring metals are precipitated from the cashew nut shell liquid and these can be left in or removed by filtering or by means of a centrifugal separator while the so treated cashew nut shell liquid is in a liquid condition. It will be apparent that for some purposes it will be advantageous to remove such metals, as for example, in any use of the so treated cashew nut shell liquid in the making of electrical insulation such as varnishes, molded parts and so on.

In addition to the above illustrative examples for treating cashew nut shell liquid for precipitating naturally occurring metals therefrom and for precipitating such metals therefrom and also for polymerizing the cashew nut shell liquid, the following further illustrative examples of methods for these purposes are given.

EXAMPLE F—*Step 1*.—To two tons (4000 pounds) of cashew nut shell liquid in a steel tank about one hundred twenty pounds (3% by weight of the cashew nut shell liquid) a commercial grade of mono-isopropyl acid sulphate are added and thoroughly mixed with an agitator and the mixture heated by means of steam passed through coils of pipe immersed in the mixture, the agitator being continued during the heating. The heating is carried on until the temperature of the mixture reaches 325° F. which takes about one and one-half hours to two hours in the particular apparatus used for the present example. On reaching the desired temperature the steam is turned off to discontinue the heating. During this heating the mono-isopropyl acid sulphate reacts with metal bearing compounds in the cashew nut shell liquid whereby the metals are precipitated as the sulphate salts. Also, the cashew nut shell liquid is thickened due to the polymerizing action of the mono-isopropyl acid sulphate. On reaching the desired temperature the treated cashew nut shell liquid is drawn from the tank and pumped while still hot through a filter press to remove the precipitated salts, which latter, upon their precipitation remain for some time in suspension in the cashew nut shell liquid, serve as a filter aid in the press and build up a cake through which the cashew nut shell liquid passes. This treated and filtered cashew nut shell liquid, hereinafter called "treated cashew nut shell liquid," upon cooling is liquid and of slightly higher viscosity than commercial untreated cashew nut shell liquid and is stored in tanks for use and is suitable for making varnishes, resins as by reaction with aldehyde, and for other uses for which cashew nut shell liquid is known to be suitable, including further polymerization to various stages including among others the liquid, semi-liquid and rubbery states in which latter state the product is known by the trade-mark name of "Cardolite."

*Step 2.*—About ten pounds each of water and concentrated sulphuric acid are mixed with an agitator into one thousand pounds of the above "treated cashew nut shell liquid" in a jacketed copper lined kettle and heated by steam to a temperature of about 320° F. where considerable frothing occurs, at which point the steam is turned off and cold water circulated through the jacket to retard further polymerizing reaction. The resulting product can be drawn off for storage or immediate use as soon as the above temperature is used. The product when cooled to normal temperature is a thick liquid and is suitable for the various uses of cashew nut shell liquid including those above noted for "treated cashew nut shell liquid."

*Step 3.*—A further step for treatment according to the present invention is to let the material of Step 2 remain in the kettle and hold until the temperature reaches 285° F., which will occur with the steam off and cold water flowing through the jacket, at which point about twenty pounds of commercial diethyl sulphate are added and mixed until the temperature reaches 250° F. when the material is drawn from the kettle and into shallow pans for a depth of about three inches. To get a rubber-like consistency, the product called "Cardolite," the material in the shallow pans is placed in ovens and cured for about fifteen hours at about 260° F. to 275° F.

EXAMPLE G.—To a given quantity of the "treated cashew nut shell liquid" of Step 1 of Example F there is added about two per cent by weight of diethyl sulphate which is stirred in to get a uniform solution of the two. The solution is then heated to bring it up to about 320° F. whereupon the heating is discontinued and the material held until frothing caused by evolution of sulphur dioxide gas subsides, whereupon the material is poured into shallow pans and set in oven to cure for about fifteen hours at about 260° F. to 275° F. The resulting product is a resilient solid, rubber-like in character, and, like the corresponding material in Step 3 of Example F above, is known on the market as "Cardolite."

EXAMPLE H.—About four hundred parts weight of raw cashew nut shell liquid, eighty parts of isopropyl alcohol and nine parts of concentrated sulphuric acid are heated under a reflux condenser at about 100° C. for about four hours, after which the isopropyl alcohol is distilled off, the ends of the alcohol being blown off with a current of air with the temperature of the treated cashew nut shell liquid at about 160° C. The treated cashew nut shell liquid is then centrifuged or put through a filter press to separate out any salts precipitated after which it is tanked for use for any purpose for which cashew nut shell liquid is suitable, as for example, by condensation with an agent containing a reactive methylene group, such as formaldehyde, paraform, hexamethylenetetramine, furfuraldehyde and so on.

The materials of the present invention at various viscosities ranging from those which are of comparatively low viscosity, through the intermediate viscosities to and including the rubber-like consistency ("Cardolite"), such for example as the materials of Examples A to H, above, can be used for making varnishes, paints, impregnating materials, electrical insulation and other products by the general and particular methods set forth in the Patents 1,725,791 to 1,725,797; 1,771,785, 1,771,786, 1,819,416, 1,821,095, 1,838,070 to 1,838,077 of Harvey and others and in other United States patents on cashew nut shell liquid products to which reference is hereby made, to get products which are free of the vesicant characteristic of raw cashew nut shell liquid. Certain of the products of the present invention, resulting from the treatment of cashew nut shell liquid with an agent capable of precipitating naturally occurring metals from cashew nut shell liquid or capable of polymerizing cashew nut shell liquid, or capable of both precipitating naturally occurring metals from cashew nut shell liquid and polymerizing cashew nut shell liquid, are in the liquid state in various viscosities ranging from about the viscosity of raw cashew nut shell liquid to a heavy liquid state, and in the present invention are non-drying and will stand in bulk at normal temperature without changing their characteristics of reaction with driers such as manganese resinate or of condensing with materials such as formaldehyde.

As examples of equivalents of concentrated sulphuric acid in the amounts used as hereinabove set forth the following are given. One to ten per cent by volume of phosphorous oxychloride to raw cashew nut shell liquid can be used in the methods of the examples above given. Also, one to ten per cent by weight of zinc chloride to raw cashew nut shell liquid can be used by the same methods. Water, alcohol or other solvent can be used where suitable for distributing the polymerizing chemical throughout the cashew nut shell liquid, and solvents can be used for washing the polymerizing chemical out when the desired degree of polymerization is reached and the viscosity of the treated cashew nut shell liquid permits. When a strong polymerizing chemical such as sulphuric acid is used it should be mixed with the solvent before adding to the cashew nut shell liquid to avoid local and uneven polymerization. In the case where the polymerizing chemical produces soluble salts from the cashew nut shell liquid, these salts can be washed out with water.

Following are examples of reactions of cashew nut shell liquid which has been treated for reducing the vesicant reaction thereof (described above in terms of the precipitation of naturally occurring metals the cashew nut shell liquid or of the polymerization of the cashew nut shell liquid) with an agent containing a reactive methylene group are as follows:

*Example 1.*—Into a given weight of the "thick liquid" of Step 2 of Example F above, about eight per cent by weight of paraformaldehyde are stirred in. This mixture sets comparatively quickly and is suitable for filling in electric transformer pot-heads, into which it is applied as soon as the mixture is made. This mixture is suitable also for covering splices in electric cables. The characteristics of good electrical insulation and resistance to moisture, plasticity when first prepared and solidity when set make this material suitable for these and other uses.

*Example 2.*—Into a given weight of the "treated cashew nut shell liquid" of Step 1 of Example F above, from about four per cent to about ten per cent of hexamethylenetetramine are stirred or mixed and the mixture cured at about 250° F. to about 285° F. from about six to about sixteen hours to a thick condensation reaction product suitable for uses for which rubber is employed. The consistency of the condensation reaction product can be predetermined by selecting the percentage of hexamethylenetetramine used and the time and temperature of curing to suit particular uses. This condensation reaction product is suitable also for the impregnation of various objects, such, for example, as electric coils the condensation reaction being carried on or at least completed after the coil has been impregnated with the cashew nut shell liquid hexamethylenetetramine mixture or with the partially reacted product thereof.

*Example 3.*—The material of Step 3 of Example G above which is a rubber-like consistency and is called "Cardolite" can be mixed on rubber mixing rolls with about seven per cent of its weight of hexamethylenetetramine to get thorough admixture, after which the mixture is cured at about 275° F. for about sixteen hours to get a hard reaction product. This hard reaction product is suitable for various uses among which, for example, is the making of a powder or a fine dust as by grinding and the incorporation of the powder or dust in brake-linings as a heat and friction resistant element or its incorporation into rubber mixtures for the same purpose as carbon black is used with the additional advantage of the characteristic of heat conductivity of said powder or fine dust.

Further examples can be drawn from the reactions of reactive methylene group containing agents with each of the products of the treatment of the cashew nut shell liquid with sulphuric acid or its equivalent set forth above in Examples A to H, inclusive, in manners and by methods similar to those set forth in those patents of M. T. Harvey identified above by their numbers, to which reference is hereby made. The following Examples J, K and L disclose the condensation, the "treated cashew nut shell liquid" with reactive methylene group or "treated cashew nut shell liquid" suitable for such condensation, the "treated cashew nut shell liquid" being either alone or in mixtures with other materials and the condensation with the reactive methylene group being made before or after the "treated cashew nut shell liquid" goes into such said mixture. And the materials of Examples J, K and L can be used in the same way as those of Examples A to H.

EXAMPLE J.—About 100 parts by weight of raw cashew nut shell liquid and 5.4 parts of concentrated sulphuric acid are emulsified together with about 15 parts of water and heated to about 300° F. to 375° F. for about 30 to 45 minutes to produce a body of a consistency which may vary from a very heavy cold molasses to a ropy sticky mass. The temperature and time of heating are regulated to suit the size of batch and to take into consideration the fact that an exothermic reaction takes place. The temperature may run from 300° to 350° F. or more after application of heat is discontinued, the ultimate use of the material and method of application thereof being used as a guide in the temperature control. The product resulting from the method of Example J is suitable for making electrical insulation, for gasket material, for waterproofing and other uses and can be used in making varnishes, coatings, impregnations, and molded composition. The material of Example J is suitable for application to metal, wood, paper, cloth ond other materials. Gasket material can be made by application to lamp wicking or fabric sheets or webbing, the material, after the application, being set at a temperature of about 260° to 285° F. for a period of about 8 to 15 hours to produce a resilient rubbery consistency. This product is insoluble in lubricating oils and greases and is impervious to water, has good electrical insulating properties, long life and other desirable characteristics.

EXAMPLE K.—The material of Example J is suitable for mixture with rubber to increase its imperviousness to oils and water and moisture and to increase its dielectric property. In such use the material of Example J can be heated at about 260° to 285° F., for example, for about 8 to 15 hours to produce a resilient rubber-like mass which can be comminuted and intermixed with rubber in amounts ranging from about 5% or less to 80% or more of the mixture depending on the characteristics desired in the finished product. This resilient rubber-like product which is mixed with the rubber is more impervious to water and moisture and oil than is rubber and has a higher dielectric than rubber and imparts these characteristics to the rubber mixture. Another important advantage is that this resilient rubbery product has unusual ageing qualities and that it imparts this quality to a rubber mixture made therewith to give a much greater life than in the rubber itself.

EXAMPLE L.—For another material for modifying rubber, and other materials, and as a substitute for rubber the following is given: 100 parts by volume of raw commercial cashew nut shell liquid and about 2½ parts of concentrated sulphuric acid are emulsified with 15 parts of water and heated to 325° to 375° F. after which about 4% of sulphur by volume of the cashew nut shell liquid are worked in at about 300° to 350° F. or upward. The composition in this condition is ready for working into a rubber mixture batch in most any proportion and can be used itself alone as a rubber substitute and vulcanized. The percentages given are given only as examples and variations may be made within the limitations for sulphuric acid given above, the percentage of sulphur can be varied greatly to give soft or hard products as desired or required and the temperature varied to suit.

In Examples K and L the term rubber is intended not only to cover rubber alone but also the rubber mixtures well known in the art in which are incorporated such materials as asphalts, pitches, waxes, gums, stearates and so on and also the usual inorganic fillers and modifiers well known in the art and also the known vulcanizers, accelerators and so on.

*Example 4.*—The material of Example J can be thinned with a solvent such as Varnolene, fifty parts solids for example, and cloth impregnated therewith after which the impregnated cloth is dipped in commercial formaldehyde and the cloth hung in an oven at about 265° F. to set. This product is suitable for electrical insulation, waterproofing, acid and alkali proofing and so on and for use in the arts generally.

Compositions comprising reaction products of cashew nut shell liquid and sulphuric acid, with or without sulphur are soluble in cashew nut shell liquid as are also compositions made of rubber, with or without a vulcanizer, and the reaction product of cashew nut shell liquid and sulphuric acid. This characteristic can be used to advantage in applying these products, for example, in making impregnated belting, electrical insulation and other products. After application the solvent cashew nut shell liquid can be left untreated or can be set by the application of heat to make it react with any of the setting or vulcanizing materials which may be contained in the composition dissolved, such for example, as sulphur or hexamethylenetetramine and so on or the treated material can be dipped in sulphuric acid or in a solution of formaldehyde to fix the free cashew nut shell liquid at the surface of the material treated. Hard wood pitch which is insoluble in petroleum and in linseed and China-wood oils is soluble in cashew nut shell liquid and can be dissolved in cashew nut shell liquid together with the compounds of Examples J or K or the others in proportions ranging either way from equal parts. It is noted that as low as five or ten percent of cashew nut shell liquid is sufficient to dissolve a given weight of the material of Example J or K or of any of this material together with hard wood pitch.

The electric insulation materials made according to the present invention have good dielectric, good ageing qualities, resistance to moisture, and withstand corona effects of high voltage discharges. The products of the invention are useful in the arts generally and particularly in those of plastics, coatings, impregnations, moldings, and in the hard and soft rubber and allied arts and in these the high ageing quality of the products of the invention is present together with other desirable characteristics.

The preparatory and intermediate products described herein are adapted for further heating with or without other materials to produce other products for particular uses. Examples of other materials are those commonly used in paints, varnishes, lacquers and allied products, such as natural and artificial resins and gums, such as copals, coumar resin, Bakelite, rosin, etc., naturally drying oils such as China-wood oil, linseed oil, fish oil, non-drying oils such as castor oil, etc., sulphur, pitches, waxes, asphalts, rubber and other materials commonly used. Driers and setting materials such as litharge, manganese resinate, formaldehyde, paraform, hexamethylenetetramine and so on can also be used to suit products for various purposes. The products of the invention, e. g., the product of Example J are suitable for plasticisers for various materials such as those above mentioned. Examples of methods and the ingredients and particular percentage will be given hereinafter.

The present application is a continuation in part of our copending application Serial Number 714,448 filed March 7, 1934, now Patent No. 2,128,247, and through the latter is a continuation in part of our then copending application Serial Number 620,551, filed July 1, 1932.

Having thus described our invention, what we claim new and desire to protect by Letters Patent is:

1. The method which comprises mixing cashew nut shell liquid with from about 1% to about 10% of its weight in a mineral acid polymerizing agent and heating from about 300° F. to about 375° F. to produce a body of a consistency which may vary from a very heavy cold molasses to a ropy mass, and then heating from about 260° F. to about 285° F. for from about eight to about fifteen hours to obtain a resilient rubber-like solid mass which can be comminuted.

2. The method which comprises mixing cashew nut shell liquid with from about 1% to about 10% of its weight in a mineral acid polymerizing agent and heating from about 300° F. to about 275° F. to produce a body of a consistency which may vary from a very heavy cold molasses to a ropy mass, and then heating from about 260° F. to about 285° F. for from about eight to about fifteen hours to obtain a resilient rubber-like solid mass which can be comminuted, then condensing with a reactive methylene group agent.

3. The method which comprises mixing cashew nut shell liquid with from about 1% to about 10% of its weight in a mineral acid polymerizing agent and heating from about 300° F. to about 375° F. to produce a body of a consistency which may vary from a very heavy cold molasses to a ropy mass, and then heating from about 260° F. to about 285° F. for from about eight to about fifteen hours to obtain a resilient rubber-like solid mass which can be comminuted, then condensing with an aldehyde to obtain a solid product.

4. The product obtained by the method of claim 2, said product being hard and capable of being ground into dust.

5. The product obtained by the method of claim 3, which product is hard and capable of being ground into dust.

MORTIMER T. HARVEY.
FREDERICK M. DAMITZ.